Figure 1:
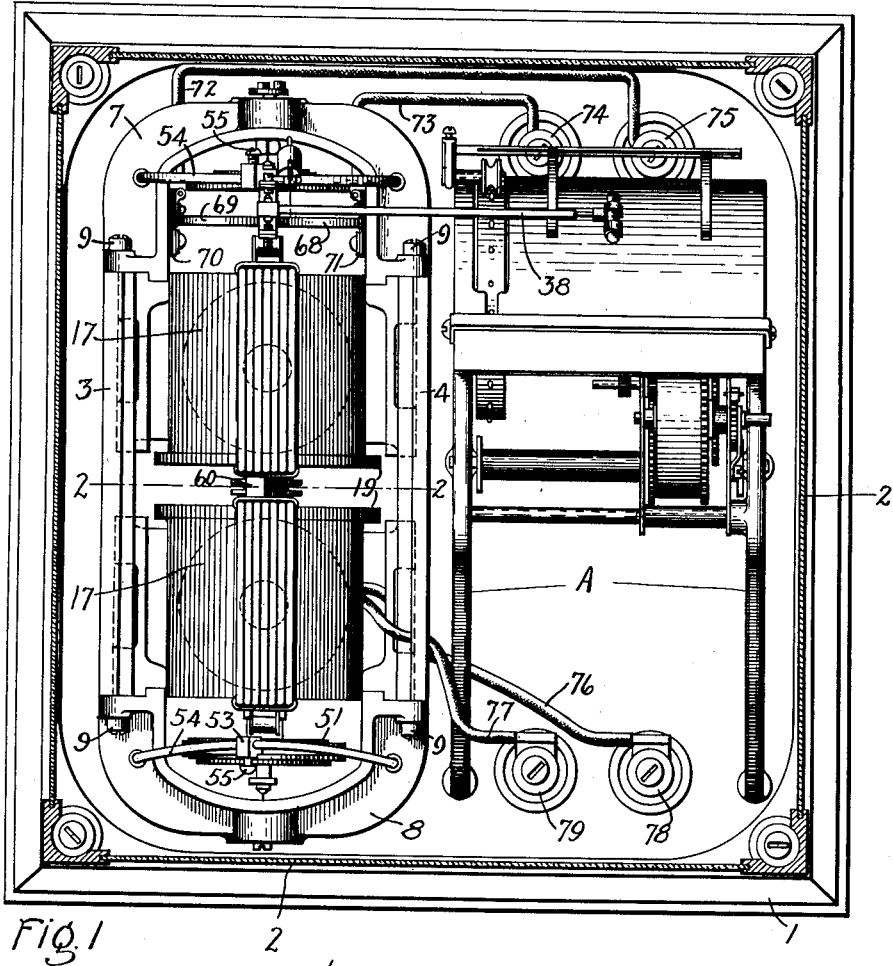

W. J. LLOYD & L. WILSON.
ELECTRICAL MEASURING INSTRUMENT.
APPLICATION FILED MAY 21, 1907.

925,113.

Patented June 15, 1909.
3 SHEETS—SHEET 1.

Witnesses:
Lloyd C. Bush
J. Ellis Glen

Inventors:
William J. Lloyd,
Leonard Wilson.
By Albert G. Davis Atty.

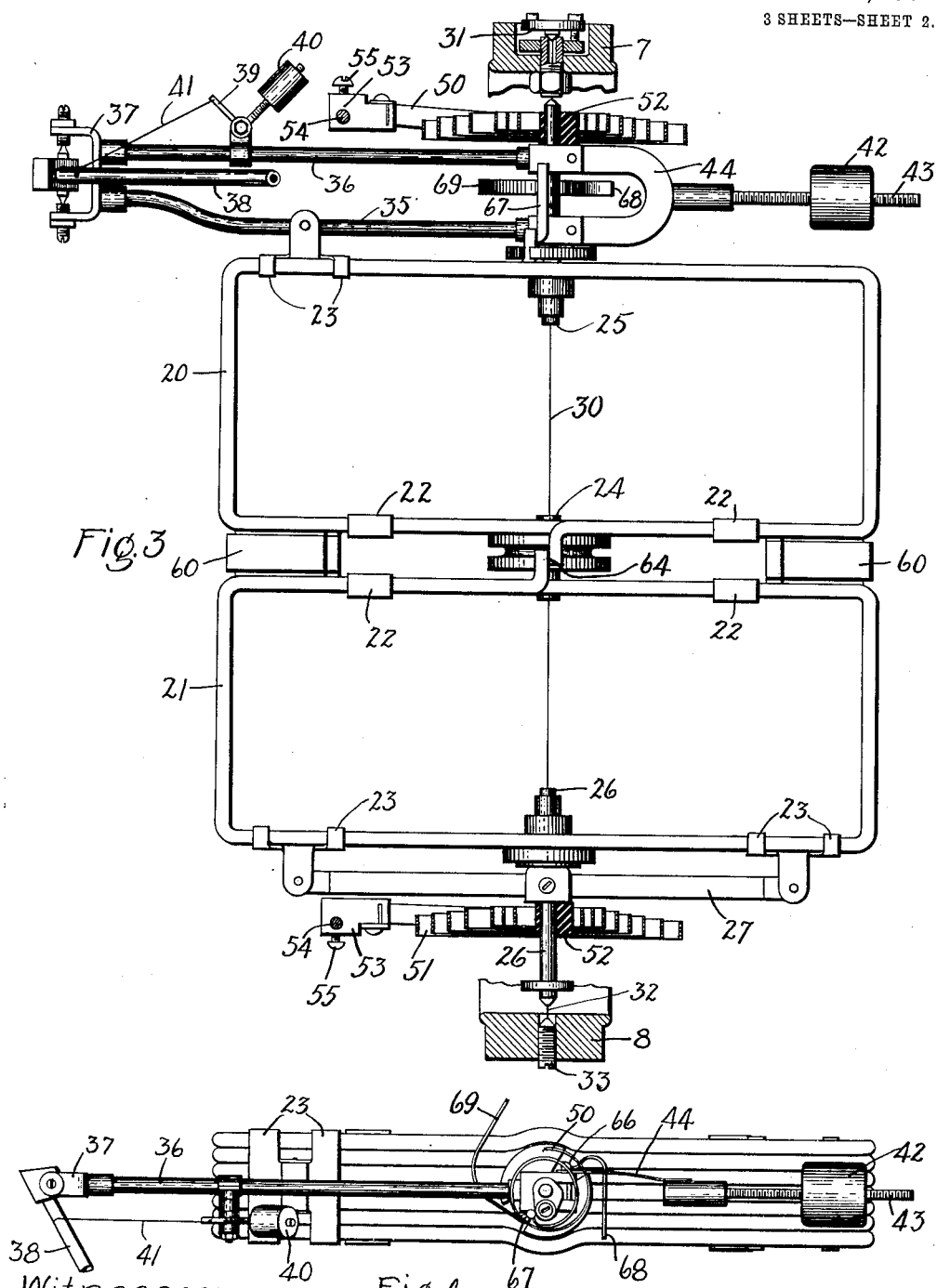

W. J. LLOYD & L. WILSON.
ELECTRICAL MEASURING INSTRUMENT.
APPLICATION FILED MAY 21, 1907.

925,113.

Patented June 15, 1909.
3 SHEETS—SHEET 3.

Witnesses:

Inventors:
William J. Lloyd,
Leonard Wilson.
By Atty.

UNITED STATES PATENT OFFICE.

WILLIAM J. LLOYD, OF RUGBY, ENGLAND, AND LEONARD WILSON, OF DENVER, COLORADO, ASSIGNORS, BY MESNE ASSIGNMENTS, TO GENERAL ELECTRIC COMPANY, A CORPORATION OF NEW YORK.

ELECTRICAL MEASURING INSTRUMENT.

No. 925,113.      Specification of Letters Patent.      Patented June 15, 1909.

Application filed May 21, 1907. Serial No. 374,909.

*To all whom it may concern:*

Be it known that we, WILLIAM J. LLOYD, a citizen of the United States, residing at Rugby, England, and LEONARD WILSON, a subject of the King of Great Britain, residing at Denver, county of Denver, State of Colorado, have invented certain new and useful Improvements in Electrical Measuring Instruments, of which the following is a specification.

Our invention relates to electrical measuring instruments and particularly to instruments intended for indicating or for recording the values of current or electromotive force in direct current circuits.

In electrical instruments of a certain type, the current to be measured, or a current proportional to the current or to the electromotive force to be measured, passes through a conductor arranged for movement in a magnetic field. This results in a tendency to movement of the conductor and, if this movement is opposed by a suitable countertorque, the deflection from zero position may serve to indicate the value of the current or electromotive force to be measured, the instrument, of course, being properly calibrated for this purpose.

The torque exerted by the current carrying conductor is proportional to the strength of the magnetic field and the current passing in the conductor, and the strength of the field being generally constant, the torque is directly proportional to the current passing in the conductor. In instruments of this type it is often desirable to have a strong torque exerted by the moving element. For this purpose instead of a permanent field magnet an electromagnet may be used, the current therefor being taken from any suitable source. It is at once evident that unless the potential applied to the windings of the electromagnet be constant, the strength of the field produced by it will vary, thereby interfering with the accuracy of the readings on the instrument.

One of the objects of our invention is to provide an instrument having a high torque produced by a strong field which, although it may vary in strength, will have no effect on the accuracy of the readings. That is, to provide means for compensating for any variations in the exciting voltage applied to the field coils where an electromagnet is used, or means for compensating for deterioration of a permanent field magnet when such a magnet is used.

Another object of our invention is the production of an instrument having a uniform scale and practically no error due to hysteresis and one which is not affected by magnetic fields in its vicinity.

Other objects of our invention will be brought out in the following description.

In order that our invention may be fully understood, we have shown and described one form of instrument in which it may be embodied. The type of instrument which we have chosen for this purpose is what is known as a curve drawing instrument, and it is for instruments of this kind, in which a strong torque is desired in order that the friction of the pen may be negligible, that our invention is particularly useful.

We wish it distinctly understood, however, that we realize that our invention is equally applicable to indicating instruments in which a pointer attached to the moving element moves over a scale on which the values of current or electromotive force corresponding to different deflections of the needle are indicated.

It is our intention to include all such applications of our invention and all modifications thereof which will occur to those skilled in the art in the claims hereto appended.

Figure 2:
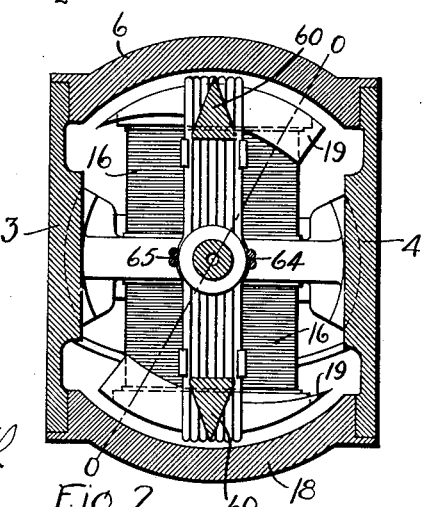
Figure 5:
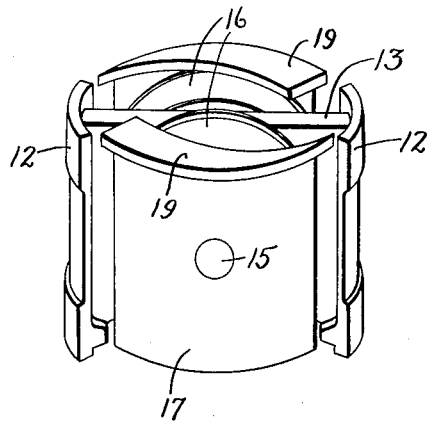
Figure 6:
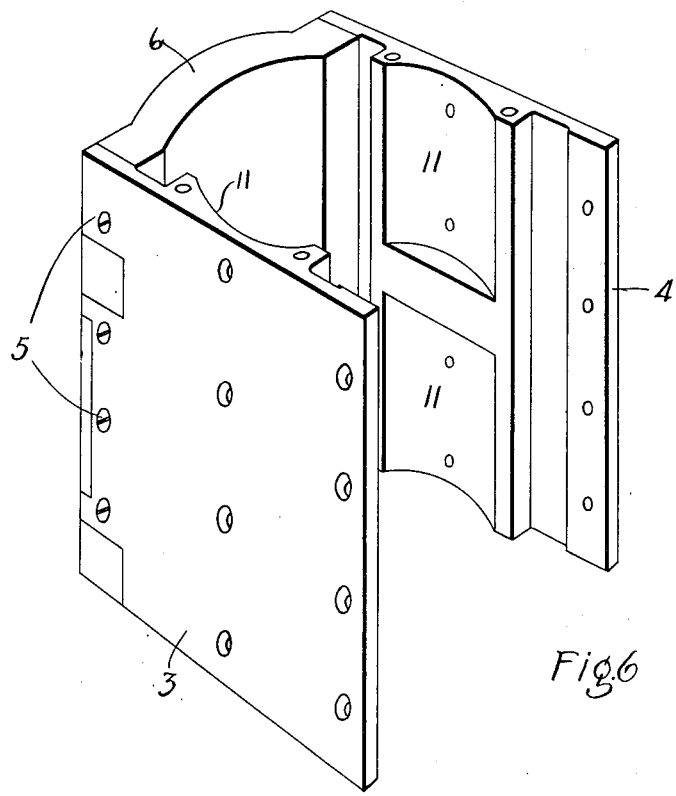

In the accompanying drawings in which like parts are denoted by the same reference characters throughout the various views, Figure 1 is a front elevation of a curve drawing instrument in which are embodied the features of our invention, one of the shells which furnishes a path for the magnetic flux being removed; Fig. 2 is a plan view in cross-section on line 2—2 of Fig. 1; Fig. 3 is an elevation partly in section of the moving element of the instrument and the supporting bearings therefor; Fig. 4 is a plan view of the moving element shown in Fig. 3 taken just below the top bearing, certain of the parts being broken away; Fig. 5 is a view in perspective of one of the electromagnets and its supporting frame; and Fig. 6 is a view in perspective showing the side plates which support the electromagnets and one of the shells which form paths for the flux from one magnet to the other.

The working parts of the instrument illustrated are mounted on a suitable base 1 and inclosed by a casing preferably having glass sides shown in cross-section at 2. This curve drawing instrument consists of two separate and distinct elements. One of these, the time recording element which is supported on the frame A, serves to move a record sheet at a definite uniform rate of speed so that the movement of the pen, in response to the energy variations to be recorded, will trace a curve from which the value of the current or electromotive force at any hour of the day may be determined. This time recording element may be of any approved construction. The other element of this curve drawing instrument is shown at the left side of the casing in Fig. 1 and serves to move the pen in response to the variations in energy to be recorded. It is to this element that our invention particularly relates.

Referring to Figs. 1, 2, 5 and 6, the side plates 3 and 4 are connected in any suitable way as by screws 5 to a curved shell 6 attached to the base-board 1 in any suitable manner. The side plates 3 and 4 are bridged at the top and bottom by the yokes 7 and 8 which support the upper and lower bearings for the moving element, said yokes being attached to the side plates by the screws 9 or otherwise. Adapted to slide in the curved recesses 11 of the side plates 3 and 4 is a T-shaped frame consisting of the curved ends 12 connected by the web 13. The parts 12 slide into and are secured in the recesses 11 and the web 13 supports the core of a magnet which forms part of the magnetic system. These field magnets, of which there are two and which are similarly supported by T-shaped frames adapted to slide in the recesses 11, each consist of a core 15 which carries exciting coils 16 and at each end the curved pole pieces 17, the outer curved surfaces of which are concentric with the inner curved surfaces of the shell 6 and the shell 18. The pole pieces 17 carry supplementary pole pieces 19 of the form shown in Figs. 2 and 5, the purpose of which will be more fully hereinafter described. The upper and lower magnets are so wound that their adjacent pole pieces are of opposite polarity; that is, at the back of the instrument upper pole piece 17 may have a north polarity while the lower pole piece 17 on that side will have a south polarity and the polarity of the pole pieces on the front side will be south at the top and north at the bottom. It is obvious that this arrangement will result in producing a magnetic circuit through the cores and pole pieces of the magnets and the soft steel shells 6 and 18. There will thus be produced at four points, between the pole pieces 17 and the shells 6 and 18, strong annular fields of uniform density. The current carrying conductor is mounted for movement in these fields which by their arrangement make the instrument astatic.

The moving element of our device is most clearly shown in Figs. 1, 3 and 4. It consists primarily of two coils 20 and 21 which are mounted for movement in the annular fields heretofore described. In the instrument shown, which is intended to be used as an ammeter, these coils each consist of a number of turns of large insulated condu'' suitably bound together by the clamps 22 and 23. These coils may be supported in any suitable manner.

In the particular construction illustrated, the coils are connected together by a small hollow shaft 24 and have attached to the top of the coil 20 a small hollow shaft 25 and at the bottom of the coil 21 a hollow shaft 26. A bar 27 may connect the clamps 23 at the bottom of the coil 21 and have at its center a hole through which the shaft 26 may pass. The moving element is suspended from the yoke 7 by a fine wire 30 which is connected to an adjustable button 31 suitably supported in a cavity at the top of the yoke 7. This wire 30 extends through the hollow shaft 25, the shaft 24, and is secured within the hollow shaft 26 in any suitable manner. A fine steel pin 32 projecting from the bottom of the shaft 26 into a ring stone jewel bearing 33 serves to keep the coils in proper alinement. Supported by the shaft 25 and the clamp 23 at the top of the coil 20, is a light frame composed preferably of two aluminum tubes 35 and 36 connected at their outer ends by the yoke 37 which carries, pivoted as shown in Fig. 3, an arm 38 at the end of which is the pen which moves over the record sheet and traces the curve which indicates the variations in the energy to be measured. This arm 38 is caused to bear against the record sheet by the pull exerted by the bell-crank lever 39 carrying the adjustable weight 40 and connected to the arm 38 by a thread 41. The arms 35 and 36 and the parts carried thereby are counter-weighted by the weight 42 threaded on a rod 43 carried by a thin U-shaped member 44 attached to the enlarged ends of the tubular shafts 35 and 36 where these are attached to the shaft 25.

The counter-torque for the moving element is furnished in part by springs 50 and 51 arranged above and below the moving coils, as clearly shown in Fig. 3. The inner ends of these springs are attached to collars 52 which are fixed on the shafts 25 and 26 and the outer ends of which are carried by blocks 53 slidable on the curved wires 54 and adjustably held thereon by screws 55. The rest of the necessary counter-torque is furnished by a magnetic control comprising control pieces 60 triangular in cross-section supported as shown in Figs. 1, 2 and 3 between the coils 20 and 21. These control pieces move in the magnetic fields existing between the horn-shaped pole pieces 19.

It is obvious that the control pieces 60 tend to locate themselves at the point in the field between the pole pieces 19 where the width of these pole pieces and therefore the number of lines of force is the greatest. This corresponds to the zero position of the instrument indicated by the line O—O in Fig. 2. Upon the shape and position of the pole pieces 19 and the control pieces 60 depends the uniformity of the scale of the instrument and it has been found that when these parts are proportioned as shown, a scale is produced which is practically uniform.

The coils 20 and 21 are so wound that they may be connected together, as shown at 64 and 65 in Figs. 2 and 3, thus forming what is in effect a single conductor. The ends are brought up alongside the shaft 25 as shown in Figs 2 and 3 and indicated at 66 and 67. To these ends 66 and 67 are connected flat flexible conductors 68 and 69 which are fastened to flat plates 70 and 71 attached to but insulated from the yoke 7 as shown in Fig. 1. The plates 70 and 71 are connected respectively to conductors 72 and 73 which lead to the terminals 75 and 74. It is to these terminals that the current to be measured, or a current proportional to the current or to the electromotive force to be measured, is applied.

In the instrument illustrated, which is an ammeter, the necessary damping is obtained from the current carrying coils themselves which, being connected across a low resistance shunt in the usual manner, act as a short-circuited turn of low resistance. In a voltmeter constructed according to our invention, the current carrying coils may be wound on metal frames which act as short-circuited turns and give the necessary damping effect. This expedient is well known in the art.

The field coils 16 on the cores 15 are connected in series, and by means of the conductors 76 and 77 are connected across the terminals 78 and 79. These terminals are attached to the source of current used for the excitation of the fields. The coils 16 on the cores 15 are of such a number of turns that at a certain normal exciting voltage the saturation of the magnetic circuit is carried up so far that a variation in voltage, even as great as 25% above or below normal, produces a change in field strength of not more than 6%. The pole pieces 19 and the control pieces 60 are so proportioned and arranged that the field existing at that point is weak and the control pieces are unsaturated. The purpose of this construction will be hereinafter explained.

The mode and theory of operation of the instrument, which we have described and in which is embodied our invention, are as follows: Under normal conditions assuming that the voltage applied to the field windings is maintained at what has been taken as the normal value, and the coils 20 and 21 correctly wound according to principles which are well understood by those skilled in the electrical art, these coils will move from their zero position against the counter-torque exerted upon them and will take up a position in the annular fields depending upon the amount of current which is passing through them. The springs 50 and 51 are so designed that they will exert a counter-torque equal approximately to one-half of the counter-torque necessary at normal excitation voltage. The magnetic control is so designed that it exerts at normal excitation voltage a counter-torque equal to that exerted by the springs, thus supplying the other half of the total counter-torque required when the field strength is normal.

In order that the readings on the instrument shall be unaffected by changes in exciting voltage, the total counter-torque exerted on the moving element must vary in the same proportion as the armature torque. In other words, assuming that a certain current is flowing in the moving coils, in order that the coils may stand still while the exciting voltage, and therefore the field strength and the armature torque varies, the total counter-torque exerted on the moving coils must vary at the same rate as does the armature torque. This result is attained by the use of the combined spring and magnetic control heretofore described.

As has been stated, the control pieces 60 move in a weak field and are unsaturated. The torque exerted by them therefore varies approximately as the square of the field strength. Thus while the armature torque varies directly as the strength of the field, part of the counter-torque varies as the square of the strength of the field.

Since the percentage variation in field strength is small the square of such percentage variation is practically equal to twice such percentage variation. It is obvious therefore that any percentage change of armature torque, due to change in field strength, is opposed by a change of twice the percentage in half the total counter-torque, or the same percentage in the whole counter-torque. This may be understood from the following example: Suppose the current in the moving coils to be fixed, and suppose that at normal exciting voltage the armature torque is 800 gm. mm. This armature torque is opposed by a counter-torque of 400 gm. mm. due to the springs 50 and 51 plus a counter-torque of 400 gm. mm. exerted by the magnetic control.

As has been before stated, the magnetic system is so designed that variations in exciting voltage of 25% above or below normal produce only 6% variation in field strength. Assuming now that the exciting current rises to 25% above normal, thereby producing a 6% increase in field strength. The armature torque will increase in the same proportion as the field strength or to $1.06 \times 800 = 848$ gm. mm. This armature torque will now be opposed by the constant counter-torque of the springs, namely, 400 gm. mm. plus the counter-torque exerted by the magnetic control which has increased in proportion to the square of the field strength and is now $(1.06)^2 \times 400 = 448$ gm. mm. (approximately), making the total counter-torque $400 \times 448 = 848$ gm. mm. It is thus evident that the counter-torque has increased at the same rate as the armature torque and the coils remain in the same position, as with normal exciting voltage. This same result holds true for a drop in exciting voltage up to 25% and our instrument therefore gives accurate readings even when the fields are excited from a circuit on which the potential varies considerably.

What we claim as new and desire to secure by Letters Patent of the United States, is,—

1. In an electrical measuring instrument, means for producing a magnetic field of variable strength, a current carrying conductor mounted to move in said field, a spring for furnishing counter-torque to the moving conductor, and a magnetic control responsive to variations in the strength of said field for adding to the countertorque of the spring a countertorque which keeps a constant relation between the total countertorque and the field strength.

2. In an electrical measuring instrument, means for producing two magnetic fields, a conductor arranged for movement in one of said fields, and means for furnishing a counter-torque to said moving conductor comprising a spring and an unsaturated magnetic control piece moving with the conductor in the other magnetic field.

3. In an electrical measuring instrument, common means for producing two magnetic fields of different strength, a current-carrying conductor arranged for movement in the stronger of said fields, a spring for exerting part of the necessary counter-torque on the moving conductor, and an unsaturated magnetic control piece responsive to the weaker of said fields to furnish a counter-torque which varies with the strength of the field at such a rate that the relation of the total counter-torque to the strength of the stronger field is always the same.

4. In an electrical measuring instrument, means for producing a magnetic field, a current carrying conductor arranged for movement in said field, a spring which exerts approximately one-half of the necessary counter-torque when the field strength is normal, and a magnetic control which at normal field strength furnishes counter-torque equal to that exerted by the spring but which as the field strength varies exerts a counter-torque which keeps the relation of the total counter-torque to the main field strength always the same.

5. In an electrical measuring instrument, an electromagnet for producing a magnetic field, a current carrying conductor arranged for movement in said field, a spring which furnishes approximately one-half of the necessary counter-torque to the moving conductor at normal excitation voltage, and a magnetic control responsive to variations in excitation voltage which at the normal excitation voltage furnishes approximately one-half the counter-torque but which at voltages other than the normal voltage exerts a counter-torque which keeps the relation of the total counter-torque to the field strength always the same.

6. In an electrical measuring instrument, means for producing a magnetic field of high magnetic density and a second field of low magnetic density, a current carrying conductor arranged for movement in said first mentioned field, a spring for exerting on the moving conductor part of the necessary counter-torque, and a magnetic control piece movable with the conductor in the second mentioned field and serving to furnish the remainder of the necessary counter-torque.

7. In an electrical measuring instrument, means for producing a magnetic field of high magnetic density and a second field of low magnetic density, a current carrying conductor arranged for movement in said first mentioned field, a spring for exerting approximately one-half of the necessary counter-torque when the field strength is normal, and a magnetic control which at normal field strength furnishes counter-torque equal to that exerted by the spring but as the field strength varies exerts a counter-torque which keeps the relation of the total counter-torque to the main field strength always the same.

8. In an electrical measuring instrument, an electromagnet for producing a magnetic field of high magnetic density and a second field of low magnetic density, a current carrying conductor arranged for movement in said first mentioned field, a spring which furnishes approximately one-half of the necessary counter-torque to the moving conductor at normal excitation voltage, and a magnetic control which at the normal excitation voltage furnishes approximately one-half the counter-torque but which at voltages other than the normal voltage exerts a counter-torque varying with the voltage to keep the relation of the total counter-torque to the field strength always the same.

9. In an electrical measuring instrument, a magnetic system having a curved field of force, a current carrying conductor arranged for movement in said curved field, and means for exerting a counter-torque on said moving conductor which will vary in proportion to variations in the strength of the curved field.

10. In an electrical measuring instrument, means for producing two curved magnetic fields having a common axis, a current carrying conductor arranged for movement in one of said fields, and a combined spring and magnetic control for the moving conductor comprising a magnetic member mounted on said conductor to move in the other of said fields.

11. In an electrical measuring instrument, a magnetic system having two curved fields of force with a common axis, a current-carrying conductor pivoted at said axis to move in one of said fields, a spring for exerting a counter-torque on said conductor, and a magnetic control piece pivoted to move in the other of said fields to furnish a counter-torque which will vary in proportion to the variations in the strength of the first field.

12. In an electrical measuring instrument, a magnetic system having two adjacent fields of force, one of said fields being curved, a current carrying conductor arranged for movement in said curved field, a spring for exerting a counter-torque on said moving conductor, and a magnetic control piece arranged to respond to variations in the other of said fields to exert an additional counter-torque on said moving conductor.

13. In an electrical measuring instrument, a magnetic system having a curved field of force, a current carrying conductor arranged for movement in said curved field, a spring for exerting on the moving conductor part of the necessary counter-torque, and a magnetic control which furnishes counter-torque which varies with the strength of the curved field at such a rate that the relation of the total counter-torque to the main field strength is always the same.

14. In an electrical measuring instrument, a magnetic system having an annular field of force of high magnetic density and a second field of low magnetic density, a current carrying conductor arranged for movement in said annular field, a spring for exerting on the moving conductor part of the necessary counter-torque, and a magnetic control piece movable with the conductor in the second mentioned field and serving to furnish the remainder of the necessary counter-torque.

15. In an electrical measuring instrument, means for producing an annular magnetic field of force comprising two magnets having curved pole faces concentric to the same axis and a shell arranged adjacent each pair of curved pole faces and concentric therewith, a current carrying conductor arranged for movement in said annular field, a spring for exerting part of the necessary counter-torque on the moving conductor, and a magnetic control piece moving with said conductor in a magnetic field between the two magnets for furnishing the rest of the necessary counter-torque.

16. In an electrical measuring instrument, means for producing an annular magnetic field of force of high magnetic density and a second field of low magnetic density comprising two magnets having curved pole faces concentric to the same axis, a shell adjacent each pair of curved pole faces and concentric therewith, pole pieces attached to the adjacent sides of each pair of pole faces, a current carrying conductor arranged for movement in said annular field, a spring for exerting part of the necessary counter-torque on the moving conductor, and a magnetic control piece moving with said conductor in the second field of force between the pole pieces.

17. In an electrical measuring instrument, a magnetic system comprising two cores having curved pole faces and arranged with their axis parallel and with their curved pole faces in the same plane, a shell arranged adjacent and parallel to each pair of pole faces, a magnetizing coil on each core so arranged as to magnetize the adjacent pole faces of the cores oppositely, a current carrying conductor arranged with two approximately rectangular coils connected together one coil surrounding each core, a spring for furnishing part of the necessary counter-torque, and a magnetic control piece arranged between the rectangular coils and moving in the magnetic field between the cores.

18. In an electrical measuring instrument, a magnetic system comprising two cores having curved pole faces and arranged with their axes parallel and with their curved pole faces in the same plane, a shell arranged adjacent and parallel to each pair of pole faces, a magnetizing coil on each core so arranged as to magnetize the adjacent pole faces of the cores oppositely, pole pieces attached to the adjacent sides of each pair of pole faces, a current carrying conductor arranged for movement in the fields between the shell and the pole faces, and a magnetic control piece movable with said conductor in a field between the pole pieces.

19. In an electrical measuring instrument, a magnetic system comprising two electromagnets arranged with their axes parallel and having curved pole faces arranged in the same plane, the adjacent pole faces being magnetized oppositely, a shell arranged adjacent each pair of pole faces, horn-shaped pole pieces attached to the adjacent sides of each pair of pole faces, a current carrying conductor arranged for movement in the fields between said pole faces and said shells, and wedge-shaped control pieces movable with said coil in the fields between said horn-shaped pole pieces.

20. In an electrical measuring instrument, a magnetic system comprising two magnets having curved pole faces concentric to the same axis, and a shell arranged adjacent each pair of curved pole faces and concentric therewith.

21. In an electrical measuring instrument, a magnetic system comprising two cores having curved pole faces and arranged with their axes parallel and with their curved pole faces in the same plane, and a shell arranged adjacent and parallel to each pair of pole faces.

22. In an electrical measuring instrument, a magnetic system comprising two cores having curved pole faces and arranged with their axes parallel and with their curved pole faces in the same plane, a shell arranged adjacent and parallel to each pair of pole faces, a magnetizing coil on each core so arranged as to magnetize the adjacent pole faces of the cores oppositely, and a current carrying conductor arranged for movement in the fields between the pole faces and shells.

23. In an electrical measuring instrument, a magnetic system comprising two magnets having curved pole faces concentric to the same axis, a shell arranged adjacent each pair of curved pole faces and concentric therewith, and pole pieces attached to the adjacent sides of each pair of curved pole faces.

24. In an electrical measuring instrument, a magnetic system comprising two magnets having curved pole faces concentric to the same axis, a shell arranged adjacent each pair of pole faces and concentric therewith, and horn-shaped pole pieces attached to the adjacent sides of each pair of curved pole faces.

25. In an electrical measuring instrument, a magnetic system comprising two cores having curved pole faces and arranged with their axes parallel and with their curved pole faces in the same plane, a shell arranged adjacent and parallel to each pair of pole faces, a magnetizing coil on each core so arranged as to magnetize the adjacent pole faces of the cores oppositely, and pole pieces attached to the adjacent sides of each pair of pole pieces.

26. In an electrical measuring instrument, a movable element comprising two coils connected in series and arranged in the same plane, and magnetic control pieces supported between said coils.

27. In an electrical measuring instrument, a movable system comprising two coils connected in series and arranged in the same plane, and wedge-shaped magnetic control pieces supported between said coils.

In witness whereof, LLOYD has hereunto set his hand this 24th day of April, 1907; and WILSON has hereunto set his hand this 14th day of May, 1907.

WILLIAM J. LLOYD.
LEONARD WILSON.

Witnesses to Lloyd:
   CHARLES H. FULLER,
   J. A. FOSTER.
Witnesses to Wilson:
   G. N. ROBINSON,
   ROBT. TAIT.